US007751577B2

(12) United States Patent
Hamada et al.

(10) Patent No.: US 7,751,577 B2
(45) Date of Patent: Jul. 6, 2010

(54) MIXER APPARATUS AND SOUND SIGNAL PROCESSING METHOD

(75) Inventors: Atsuo Hamada, Hamamatsu (JP); Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1381 days.

(21) Appl. No.: 11/067,376

(22) Filed: Feb. 24, 2005

(65) Prior Publication Data

US 2005/0190933 A1 Sep. 1, 2005

(30) Foreign Application Priority Data

Feb. 26, 2004 (JP) ............................. 2004-052135
Feb. 26, 2004 (JP) ............................. 2004-052136
Feb. 26, 2004 (JP) ............................. 2004-052137

(51) Int. Cl.
*H04B 1/00* (2006.01)

(52) U.S. Cl. ........................................ 381/119; 700/94

(58) Field of Classification Search ................. 381/119, 381/17, 18, 123, 118, 103, 104, 109, 80, 381/81, 77, 98; 700/94, 90; 84/625; 369/1-4
See application file for complete search history.

(56) References Cited

U.S. PATENT DOCUMENTS 5,524,060 A * 6/1996 Silfvast et al. .............. 381/104
6,218,971 B1 * 4/2001 Sugihara ..................... 341/110
6,301,365 B1 * 10/2001 Yamada et al. .............. 381/119
7,045,699 B2 * 5/2006 Okabayashi ................. 84/625
7,366,313 B2 * 4/2008 Kato .......................... 381/119
7,561,931 B1 * 7/2009 Kato et al. .................... 700/94

FOREIGN PATENT DOCUMENTS

JP 03-148909 A 6/1991
JP 07-015284 * 1/1995
JP 2000-322057 11/2000

OTHER PUBLICATIONS

Notice of Grounds for Rejection (Office Action) mailed Mar. 17, 2009, for JP Patent Application No. 2004-052137, four pages.

(Continued)

*Primary Examiner*—Vivian Chin
*Assistant Examiner*—Lun-See Lao
(74) *Attorney, Agent, or Firm*—Morrison & Foerster LLP

(57) ABSTRACT

Once a mixer is set in a predetermined operation, an input-logical-channel selecting section supplies sound signals, input via a cascade input terminal, to an input signal processing section via an input patch section, so that the sound signals can be mixing-processed as sound signals of normal input channels. At the same time, a portion of sound signals input via an input terminal are supplied to mixing buses, so that these sound signals can be handled as cascade-related signals. In accordance with a model of another, or cascaded-to, mixer, arrangements are made such that normal-input/output-channel input terminals can be assigned to cascade input/output purposes. With a block diagram display section indicating what signals the individual input/output terminals are currently assigned to within the mixer, a user can grasp at a glance the current assignment state.

4 Claims, 15 Drawing Sheets

OTHER PUBLICATIONS

Digital Production Console DM2000 Instruction Manual, Yamaha Corporation, p. 343.

Operation Guide of AW4416, Professional Audio Workstation, p. 22-27.

Reference Guide, AW4416 Professinal Audio Workstation, p. 14, 15, 20 and 21.

First Office Action mailed May 15, 2009, for CN Application No. 200510009575.0, with English translation, 20 pages.

Notice of Grounds of Rejection (Office Action) for Japanese Patent Application No. 2004-052136, mailed Dec. 9, 2008 (7 pages).

* cited by examiner

| INPUT/OUTPUT MODEL | INPUT/OUTPUT MEDE | | | | |
|---|---|---|---|---|---|
| | CASCADE | SLOT 4 | SLOT 3/4 | SLOT 1-4 [CH 1-8] | SLOT 1-4 [CH 9-16] |
| MODEL A | ○ | × | × | × | × |
| MODEL B | ○ | × | ○ | ○ | ○ |
| MIXER 32 BUS | × | × | ○ | ○ | ○ |
| MIXER 16 BUS | × | ○ | × | × | × |

CASCADE MODE

SLOT 3/4 MODE

SLOT 1-4 [CH 1-8] MODE

SLOT 1-4 [CH 9-16] MODE

MIXER APPARATUS AND SOUND SIGNAL PROCESSING METHOD

BACKGROUND OF THE INVENTION

The present invention relates to a mixer apparatus and a sound signal processing method suited for use in a digital mixer, and a program therefor.

Generally, in digital mixers, equalize processing, sound volume adjusting processing, etc. are performed individually on sound signals of a plurality of input channels, and then the thus-processed sound signals are supplied to a plurality of mixing buses where these sound signals are mixed together. Because the number of the input channels processable by one digital mixer is limited, there has been known and used the so-called "cascade connection" technique. Such cascade connection is intended to couple or input the output signals ("cascade signals") of the individual mixing buses of one digital mixer directly to the mixing buses of another digital mixer, so as to allow the two digital mixers to function as if they were one large-scale mixer having input channels equal in number to the total number of the respective input channels of the two digital mixers (see, for example, Japanese Patent Application Laid-open Publication No. HEI-7-15284).

For such cascade connection, the digital mixers are provided with cascade input and output terminals. However, where there is employed a digital mixer of a given model ("first model") using, as its terminals for normal input and output channels, terminals of the same type as cascade connecting terminals of another digital mixer of another model ("second model"), then all sound signals output from the first model to the second model can be handled in the second model only as "cascade signals", which was very inconvenient. Further, because the specifications of the cascade connection variously differ among various models, it was very difficult to cascaded different models.

SUMMARY OF THE INVENTION

In view of the foregoing, it is an object of the present invention to provide a mixer apparatus, sound signal processing method and program which can achieve flexible input/output of cascade-related signals using a plurality of different types of terminals.

It is another object of the present invention to provide a mixer apparatus, sound signal processing display method and program which can achieve flexible connection between models differing from each other in cascade input/output specifications, and which allow a user to readily grasp a state of the cascade connection.

It is still another object of the present invention to provide a mixer apparatus, sound signal processing method and program which can achieve flexible cascade connection between models differing from each other in cascade input/output specifications.

According to a first aspect of the present invention, there is provided an improved mixer apparatus, which comprises: first input terminals that input first sound signals of a plurality of channels; a plurality of mixing buses that perform mixing processing on sound signals; a second input terminal that inputs second sound signals of a plurality of channels, the channels of the second sound signals corresponding to the plurality of mixing buses; an input processing section that performs equalizing processing on sound signals supplied to the first input terminals, and sends the sound signals, having been subjected to the equalizing processing, to one or more desired mixing buses among the plurality of mixing buses; and a control section that performs control such that: the input processing section is supplied with the second sound signals instead of a group of sound signals that constitute at least a portion of the first sound signals; and signal processing, including the equalizing processing, is performed by the input processing section on the supplied second sound signals so that the second signals having been subjected to the equalizing processing are sent to one or more desired mixing buses among the plurality of mixing buses. With such arrangements, the mixer apparatus of the invention can achieve flexible input of cascade-related signals using a plurality of different types of terminals. The control by the control section is permitted when the mixer apparatus is set in a predetermined operation mode. In this manner, the mixer apparatus is allowed to operate in an optimal operation mode in accordance with a model of another mixer to which the mixer apparatus is cascaded.

According to a second aspect of the present invention, there is provided an improved mixer apparatus, which comprises: first output terminals that output first sound signals of a plurality of channels; a plurality of mixing buses that perform mixing processing on sound signals; a second output terminal that outputs second sound signals of a plurality of channels, the channels of the second sound signals corresponding to the plurality of mixing buses; an output processing section that performs equalizing processing on a sound signal outputted from each of the mixing buses and sends the sound signals, having been subjected to the equalizing processing, to the first output terminals as the first signals; and a control section that performs control such that sound signals having not been subjected to the equalizing processing, outputted from individual ones of the mixing buses, are outputted, via the first output terminals, instead of a group of sound signals that constitute at least a portion of the first sound signals of the plurality of channels outputted by the output processing section. With such arrangements, the mixer apparatus of the invention can achieve flexible output of cascade-related signals using a plurality of different types of terminals. The control by the control section is permitted when the mixer apparatus is set in a predetermined operation mode. In this manner, the mixer apparatus is allowed to operate in an optimal operation mode in accordance with a model of another mixer to which the mixer apparatus is cascaded.

According to a third aspect of the present invention, the mixer apparatus further comprises a display section that, when the second sound signals are supplied to the input processing section under control of the control section, displays a setup screen indicating the supply, to the input processing section, of the second sound signals.

According to a fourth aspect of the present invention, the mixer apparatus of the above-mentioned second aspect further comprises a display section that, when sound signals, having not been subjected to the equalizing processing, are outputted via the first output terminals under control of the control section, displays a setup screen indicating the output, via the first output terminals, of the sound signals. Thus, the present invention permits flexible cascade connection between models differing in the cascade input/output specification, and also allows the user to readily grasp or ascertain a cascade connection state by viewing the setup screen.

According to a fifth aspect of the present invention, there is provided an improved mixer apparatus, which comprises a plurality of first input terminals that input first sound signals of a plurality of channels; a plurality of mixing buses that perform mixing processing on sound signals; a second input terminal that includes a plurality of pins and that inputs second sound signals of a plurality of channels via the pins; an input processing section that performs equalizing processing on the sound signals supplied to the first input terminals, and sends the sound signals, having been subjected to the equalizing processing, to one or more desired mixing buses among the plurality of mixing buses; a selection section that selects a supply source of sound signals to be supplied to the mixing buses without being subjected to the equalizing processing; a first input control section that, when a first supply source is selected by the selection section, inputs the second sound signals, inputted to the pins of the second input terminal, directly to the mixing buses corresponding to the pins, without changing a channel arrangement that defines channel correspondency between the pins and the mixing buses; and a second input control section that, when a second supply source is selected by the selection section, changes the channel arrangement that defines the channel correspondency between the pins and the mixing buses, and supplies the second sound signals, inputted to the pins of the second input terminal, to the mixing buses in accordance with the changed channel arrangement.

Thus, control can be performed as to whether the channel arrangement defining the channel correspondency between the pins of the second input terminal and the mixing buses should be changed or should not be changed, in accordance with the selected supply source of the sound signals that are to be supplied to the mixing buses without being subjected to the equalizing processing. Through the change or switching of such an input-side channel arrangement, the present invention can flexibly make cascade connection to a wide variety of models.

According to a sixth aspect of the present invention, there is provided an improved mixer apparatus, which comprises: a plurality of first output terminals that output first sound signals of a plurality of channels; a plurality of mixing buses that perform mixing processing on sound signals; a second output terminal that includes a plurality of pins and outputs, via the pins, second sound signals of a plurality of channels corresponding to the plurality of mixing buses; an output processing section that performs equalizing processing on the sound signals supplied to the first output terminals, and sends the sound signals, having been subjected to the equalizing processing, to one or more desired mixing buses among the plurality of mixing buses; a selection section that selects a supply destination of sound signals, having not been subjected to the equalizing processing, outputted from the mixing buses; a first output control section that, when a first supply destination is selected by the selection section, outputs the sound signals, outputted from the mixing buses, directly via the second output terminal via the pins corresponding to the mixing buses, without changing a channel arrangement that defines channel correspondency between the pins and the mixing buses; and a second output control section that, when a second supply destination is selected by the selection section, changes the channel arrangement that defines the channel correspondency between the pins and the mixing buses, and causes the sound signals, outputted from the mixing buses, to be output via the corresponding pins of the second output terminal in accordance with the changed channel arrangement.

Thus, control can be performed as to whether the channel arrangement defining the channel correspondency between the pins of the second output terminal and the mixing buses should be changed or should not be changed, in accordance with the selected supply destination of the sound signals having not been subjected to the equalizing processing which are output from the mixing buses. Through the change or switching of such an output-side channel arrangement, the present invention can flexibly make cascade connection to a wide variety of models.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

1. Example Hardware Setup of Embodiment

Figure 1:
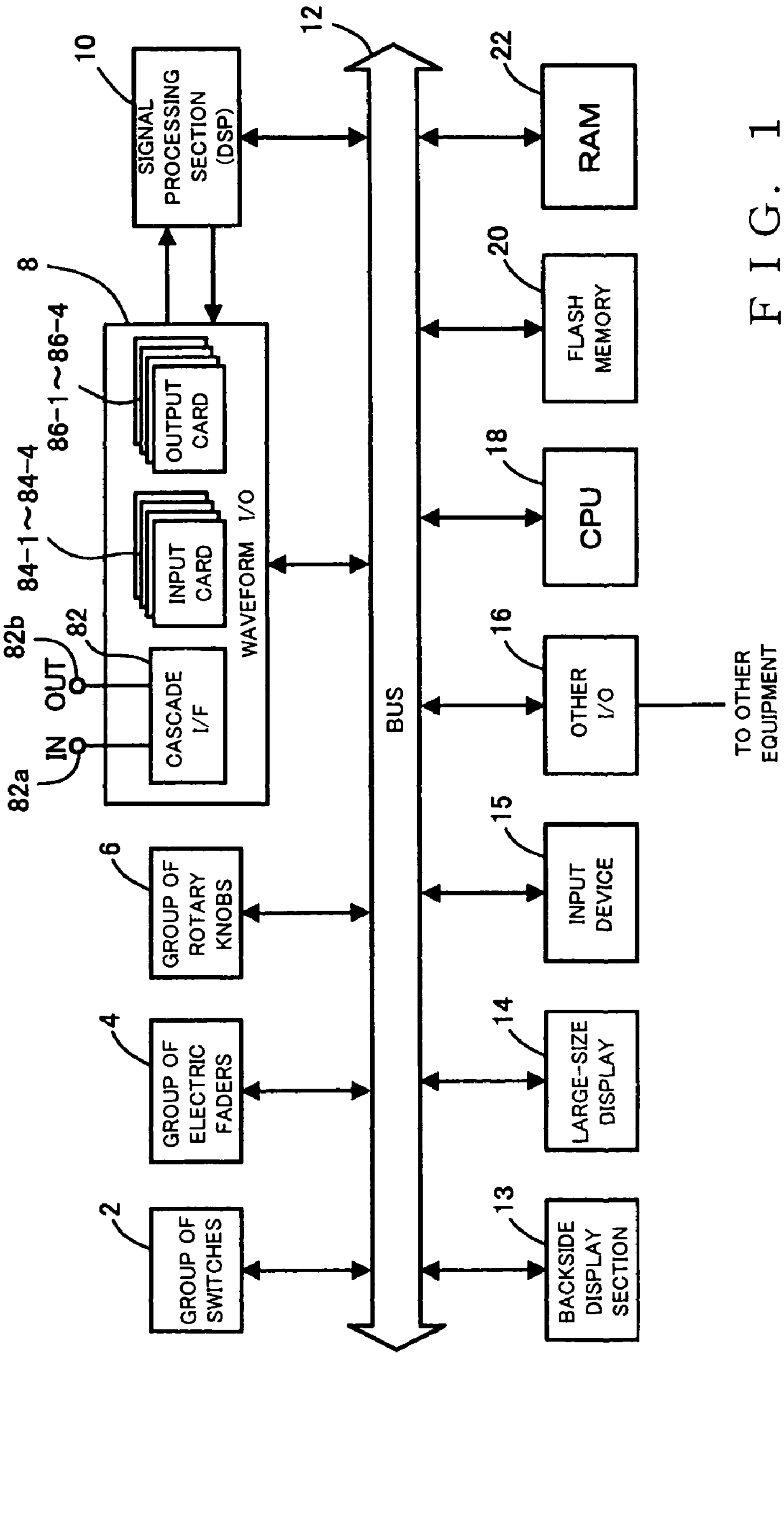
FIG. 1 is a block diagram showing an example general hardware setup of a digital mixer in accordance with an embodiment of the present invention.

A description will be made about an example general hardware setup of a digital mixer in accordance with an embodiment of the present invention, with reference to FIG. 1.

As shown, the digital mixer of the present invention includes a group of electric faders 4 that are provided to adjust signals levels of individual input and output channels on the basis of operation by a user or human operator. The group of electric faders 4 are also constructed so that an operating position of any of the electric faders 4 is automatically set in response to an operation command supplied via a bus 12.

Reference numeral 2 represents a group of switches that includes various switches and LED keys, and the illuminating/deilluminating (OF/OFF) state of an LED built in each of the LED keys is set via the bus 12. Group of rotary knobs 6 includes a plurality of rotary knobs for setting left and right sound volume balance of each input/output channel, and the like. Operated amounts of these rotary knobs are output via the bus 12. Reference numeral 8 represents a waveform I/O section which inputs/outputs analog or digital audio or sound signals (for convenience, hereinafter referred to as "sound signals"). In the instant embodiment, mixing processing, effect processing, etc. of various sound signals are all carried out in a digital manner. However, in actual cases, both digital sound signals and analog digital signals may be input to the digital mixer from the outside and output from the digital mixer to the outside. Therefore, in the waveform I/O section 8, conversion processes are performed, such as conversion between analog and digital signals and conversion between a plurality of different types of digital signals.

The waveform I/O section 8 includes a cascade interface section 82, a cascade input terminal 82*a* for inputting cascade signals from an external mixer, and a cascade output terminal 82*b* for outputting cascade signals to an external mixer. These cascade input and output terminals 82*a* and 82*b* are each capable of inputting or outputting digital sound signals of "32" (thirty two) channels (depicted as "MAX32ch" in the figure). Further, the waveform I/O section 8 includes two sets of four slots, and up to four input cards and four output cards can be inserted in the two four-slot sets, respectively. Other signals than the cascade signals are input/output via any of these input and output cards. The input and output cards and other input and output terminals differ from one another in shape of respective terminals. As the input and output terminals of the instant embodiment of the digital mixer, there are described only the cascade input and output terminals 82*a* and 82*b* and input and output cards, for convenience of description; however, the instant embodiment of the digital mixer includes a plurality of other input terminals and a plurality of other output terminals, in addition to the above-mentioned.

Reference numerals 84-1-84-4 represent the four input cards, each of which receives an analog or digital signal from the outside and converts the received analog or digital signal into a digital signal of a predetermined internal format of the digital mixer. The input cards 84-1-84-4 are of various types, such as a digital sound signal type and analog sound signal type, and the number of input signals to each of the input cards is either "8" or "16" depending on the type of the input card. Similarly, each of the four output cards 86-1-86-4 converts a digital signal of the predetermined internal format of the digital mixer into an analog or other-format digital signal. The output cards 86-1-86-4 are of various types, such as a digital sound signal type and analog sound signal type, and the number of output signals from each of the output cards is either "8" or "16" depending on the type of the output card.

The digital mixer also includes a signal processing section 10 which is in the form of a group of DSPs (Digital Signal Processors). The signal processing section 10 performs mixing processing and effect processing on digital sound signals supplied via the waveform I/O section 8, and it outputs processed results to the waveform I/O section 8. 13 represents a backside display section, which is disposed near the cascade input/output terminals 82*a* and 82*b* on a backside panel of the digital mixer. In the instant embodiment, as will be later detailed, any one of five different input/output modes, as shown in an "Input/Output Mode" section of FIG. 5, can be selected as an operation mode for inputting cascade signals. Thus, the backside display section 13 includes a set of (five) LEDs corresponding to the "input modes", and a set of (five) LEDs corresponding to the "output modes". One of the LEDs in each of the LED sets is selectively illuminated in accordance with the currently-selected input/output mode, while the other LEDs in each of the LED sets are deilluminated. In this way, the user can ascertain or grasp the currently-selected input and output modes, during wiring operation on the backside of the digital mixer, by looking only at the backside panel.

Further, in FIG. 1, reference numeral 14 represents a large-size display that is, for example, a flat panel display having a resolution of about "1024×768". Input device 15 includes a keyboard and mouse, which is operable by the user to move a cursor on the large-size display 14, turn on/off any of buttons displayed on the large-size display 14 and perform other necessary operation. Other I/O section 16 inputs and outputs time codes and other information from and to any of various external devices. 18 represents a CPU that controls various components of the digital mixer via the bus 12 on the basis of control programs as will be later described. In an internal program area of a flash memory 20, there are stored the above-mentioned control programs. 22 represents a RAM that is used as a working memory of the CPU 18.

2. Mixing Algorithm in the Embodiment

Figure 2:
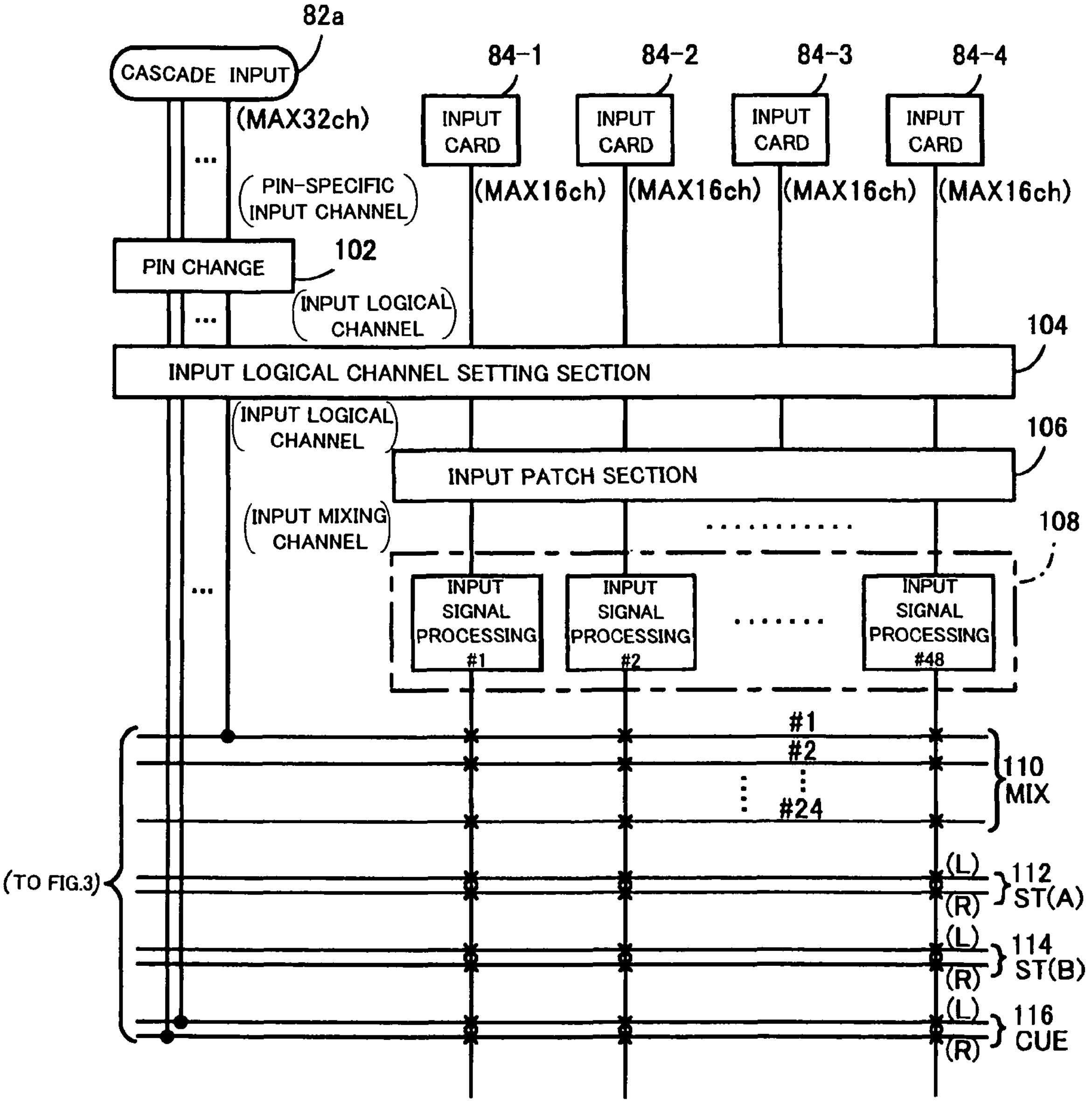
FIG. 2 is a block diagram showing of algorithms executed in the digital mixer of FIG. 1.
Figure 3:
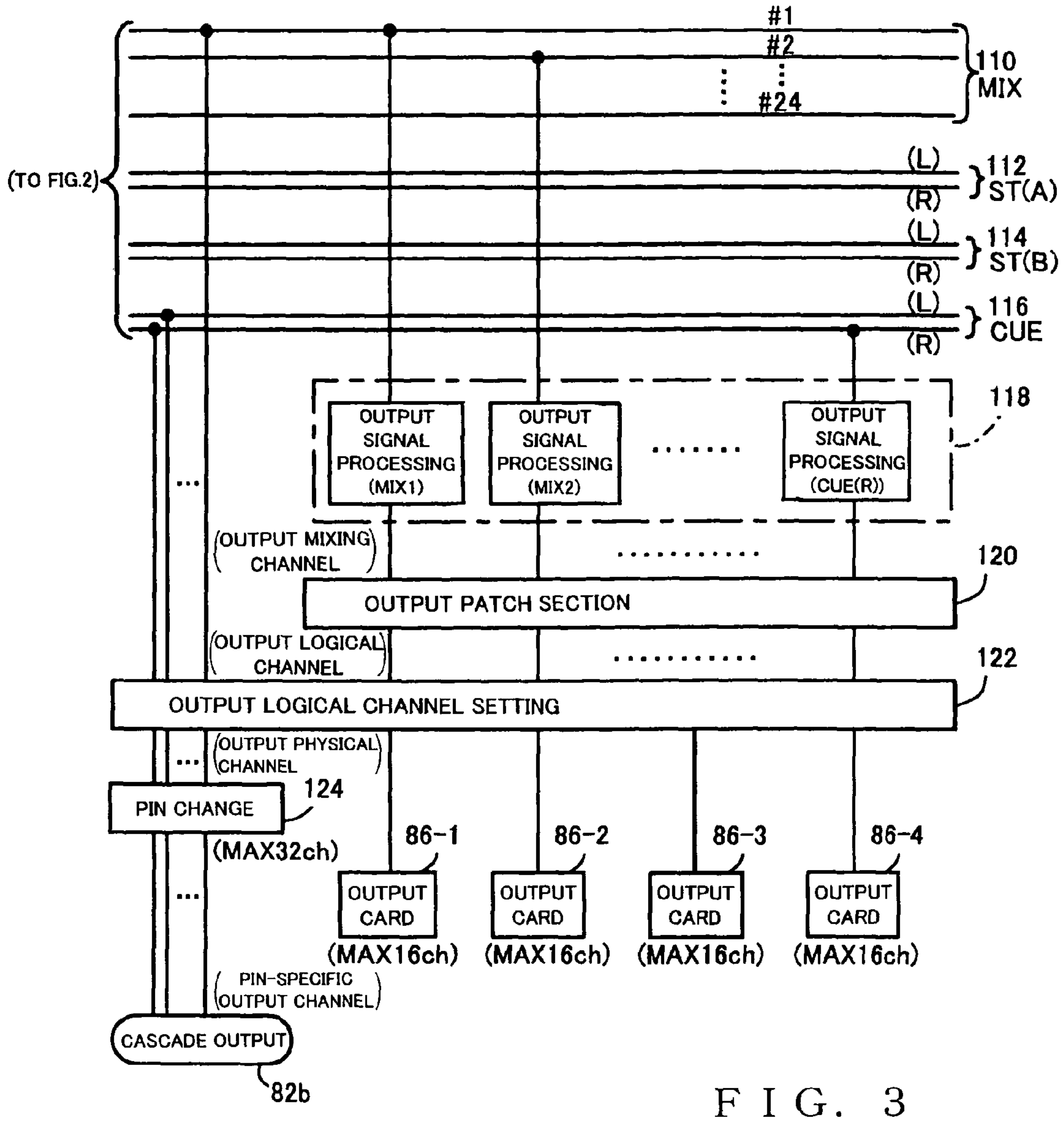
FIG. 3 is a block diagram showing of algorithms executed in the digital mixer of FIG. 1.

Now, contents of mixing algorithms executed in the signal processing section 10 etc. will be described with reference to FIGS. 2 and 3.

The input cards 84-1-84-4, output cards 86-1-86-4, cascade input terminal 82*a* and cascade output terminal 82*b* are all implemented by hardware within the waveform I/O section 8 as noted earlier, but the other components than the above-mentioned are implemented by programs running in the signal processing section 10. The cascade input terminal 82*a* is supplied with sound signals of up to "32" channels as noted above, and, in the cascade input terminal 82*a*, a separate pin is assigned to each of the sound signals. Therefore, for these sound signals, one channel can be uniquely determined by the pin number of each of the pins assigned thereto. Each channel thus determined uniquely by the "pin number" will be referred to as "PIN-specific cascade input channel".

Sound signals supplied from another mixer via the cascade input terminal 82*a* are signals corresponding to various buses to be later described (e.g., mixing buses 10, stereo buses 112, 114 and CUE bus 116). Correspondency between these buses and the pin numbers differs among various digital mixer models. Thus, in a case where cascade signals are input to the cascade input terminal 82*a* from another digital mixer of a model different from the model of the instant embodiment of the digital mixer (hereinafter "model A"), it will be convenient if correspondency between the channel numbers and the various buses is changed in advance to agree with that in model A. 102 represents a PIN change section that, once a given mixer that supplies cascade signals to the cascade input terminal 82*a* of the instant embodiment is designated, changes any of the numbers of the PIN-specific cascade input channels, as necessary, to match the correspondency in model A. Each channel thus changed, as necessary, in the number by the PIN change section 102 will herein after referred to as "cascade input physical channel".

For sound signals of a plurality of channels input via any one of the input cards 84-1-84-4, one input channel can be uniquely determined in accordance with the "slot number" of the slot having the input card inserted therein and "input terminal number" of the input card. Each input channel thus determined by the "slot number" and "input terminal number" will hereinafter be referred to as "normal input physical channel". Because sound signals of up to 16 channels (depicted as "MAX16ch" in the figure) can be input to each of the input cards, the four slots in the instant embodiment can secure a maximum of 64 (sixty four) normal input physical channels. Generally, in the conventionally-known digital mixers, sound signals of the normal input physical channels are subjected to equalizing processing etc. by an input signal processing unit (like the one 108 to be later described) and then supplied to a mixing bus group (like the one 110 to be later described) etc., while sound signals of the cascade input physical channels are supplied to the corresponding buses without being subjected to the equalizing processing etc.

By contrast, in the present invention, the sound signals of the normal input physical channels, instead of the sound signals of the cascade input physical channels, can be supplied to the buses as the cascade signals, or the sound signals of the cascade input physical channels, instead of the sound signals of the normal input physical channels, can be supplied to the input signal processing unit 108. 104 represents an input logical channel setting section, which switches, as necessary, paths of the sound signals of the normal input physical channels and cascade input physical channels. For each of the signals ultimately supplied to the various buses as the cascade signals after such path switching, one channel can be uniquely determined in correspondence with the bus to which the signal is supplied, and each channel thus determined will hereinafter be referred to as "cascade input logical channel".

Because the instant embodiment can secure a maximum of 64 normal input physical channels as noted above, 64 channels that are to be actually subjected to normal equalizing processing etc. can be assumed in one-to-one relation to the maximum number of the normal input physical channels; these channels will hereinafter be referred to as "normal input logical channels". Whereas, in the instant embodiment, up to 64 normal input physical channels can be secured, the number of the normal input physical channels decreases when an eight-channel input card is inserted in any of the slots or when no card is inserted in any one of the slots, so that there will occur one or more vacant normal input logical channels. Further, if a sound signal of any one of the normal input physical channels is used as a sound signal of the cascade input logical channel, there will occur a further vacant normal input logical channel. In the instant embodiment, a sound signal of the cascade input physical channel can be assigned to each of such "vacant" normal input logical channels.

Then, the input signal processing unit 108 performs, on sound signals of "48" (forty eight) channels, equalizing processing for adjusting frequency characteristics, sound volume adjusting processing, etc. on the basis of operation of the electric faders 4 and rotary knobs 6. Channels for specifying the sound signals in such processing will hereinafter be referred to as "input mixing channels". Input patch section 106 sets correspondency between the normal input logical channels and the input mixing channels. Group of mixing buses 110 comprises "24" (twenty four) monaural mixing buses. 112 and 114 represent stereo buses and 116 represents a CUU bus, each of which comprises a pair of left and right buses. Therefore, it may be said that, in the instant embodiment, there are provided "30" (thirty) monaural buses. If the number of the buses is "30" and the number of the cascade input logical channels is "32", two of the cascade input logical channels are too many, but these two extra cascade input logical channels are reserved for future expansion.

The input signal processing unit 108 can supply one or more desired buses from among the 30 buses 110-116, with sound signals of the individual input mixing channels at desired send levels (i.e., signal delivery levels). Sound signal of each of the cascade input logical input channels, on the other hand, can be supplied to any corresponding one of the buses. In FIG. 3, 118 represents an output signal processing unit 118, which includes output signal processing sections provided in corresponding relation to the 30 buses, performs frequency-characteristic equalizing processing, level adjusting processing, etc. on the sound signals having been mixed via these buses. Because the sound signals input and output to and from the output signal processing unit 118 correspond to the 30 buses 110-116, output channels can be set in association with the corresponding buses; these output channels will hereinafter be referred to as "output mixing channels".

As in the case of the above-described cascade input terminal 82*a*, a "PIN-specific cascade output channel" is set for each sound signal output from the cascade output terminal 82*b* to another digital mixer, using one of pin numbers of the output terminal 82*b*. If the other mixer, receiving the cascade signals from the cascade output terminal 82*b*, is of the same model (model A) as the instant embodiment of the digital mixer, the pin numbers of the output terminal 82*b* in the embodiment can be associated with "30" buses 110-116 of the other mixer. If the other mixer is of a different model from the instant embodiment, then the relationship between the pin numbers and the buses in the other mixer may differ from that in the case where the other mixer is of model A.

Assuming that the relationship between the pin numbers and the buses in the other mixer is the same as that in model A, channels can be set in such a manner as to correspond to the buses (similar to those of the instant embodiment) of the other mixer. Channels set in this manner will hereinafter be referred to as "cascade output physical channels". 124 represents a PIN change section, which, as necessary (i.e., in order to match arrangements of the pins in another model), performs a pin number change process on supplied sound signals of the cascade output physical channels and outputs the changed results as sound signals of the PIN-specific cascade output channels. Further, channels corresponding to the 30 buses 110-116 of the instant embodiment of the mixer can be set for sound signals output from the buses 110-116 for cascade connection purposes, and these channels hereinafter be referred to as "cascade output logical channels".

As in the case of the input card, an output channel can be uniquely determined, for each of sound signals of a plurality of channels output via the output cards 86-1-86-4, in accordance with the "slot number" of the slot having the output card inserted therein and "output terminal number" of the output card. Each of such channels hereinafter will be referred to as "normal output physical channels". Sound signals of up to 16 channels (depicted as “MAX16ch” in the figure) can be output via each of the output cards, and four slots are provided in the waveform I/O section 8 for insertion of four output cards, so that a maximum of 64 (sixty four) normal output physical channels can be secured. The same number of channels for outputting various results of the mixing processing can be assumed in one-to-one relation to the maximum number of the normal output physical channels; these channels will hereinafter be referred to as “normal output logical channels”. 120 represents an output patch section that sets correspondency between the normal output logical channels and the output mixing channels.

Further, in the instant embodiment, sound signals of the normal output logical channels, instead of sound signals of the cascade output logical channels, can be output, as sound signals of the cascade output physical channels, via the PIN change section 124 and cascade output terminal 82*b*. Also, sound signals of the cascade output logical channels, instead of sound signals of the normal output logical channels, can be output, as sound signals of the normal output physical channels, to the output cards 86-1-86-4. 122 represents an output logical channel setting section, which switches, as necessary, paths of the sound signals of the normal output physical channels and cascade output logical channels.

3. Behavior of Embodiment

3.1. Display of Setting Screen:

The following paragraphs describe behavior of the instant embodiment.

Figure 4:
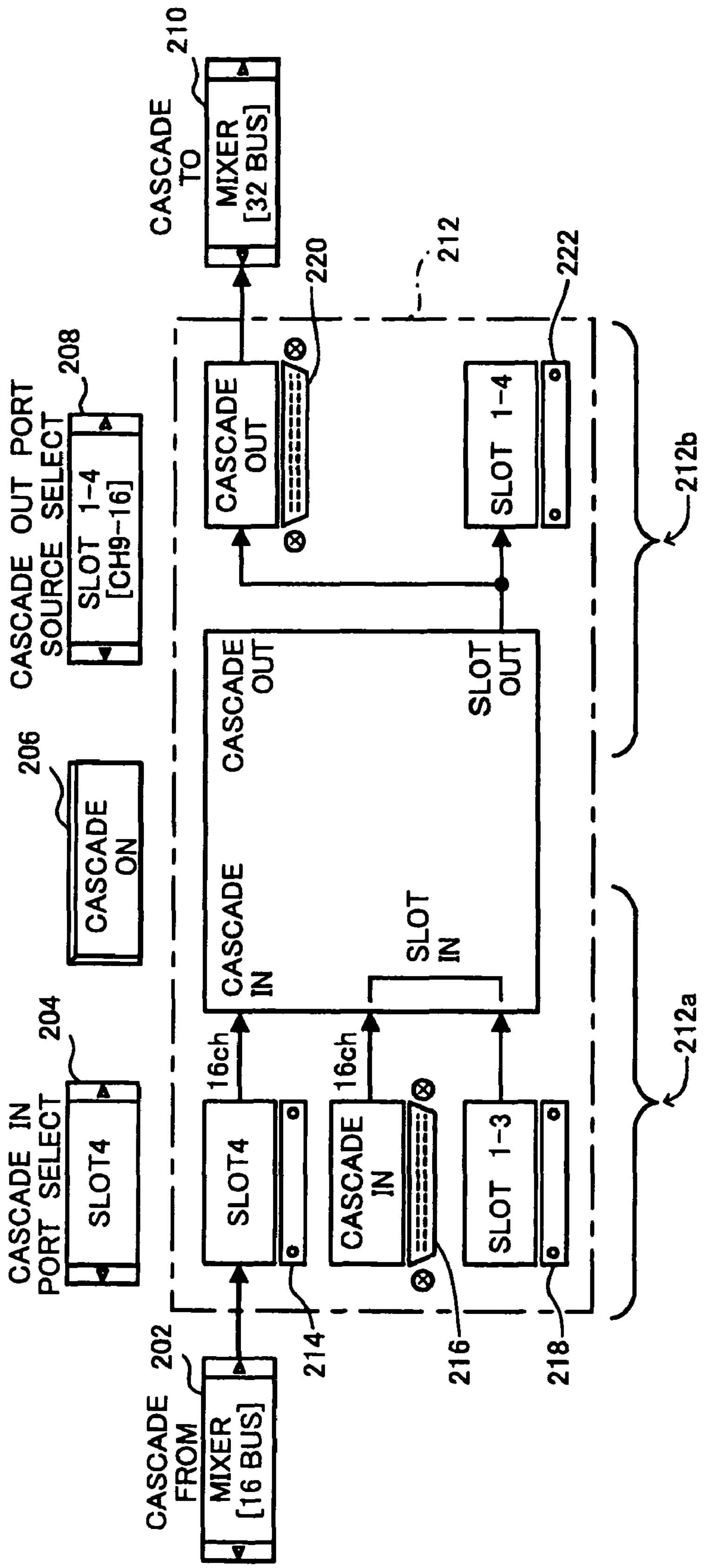
FIG. 4 is a diagram explanatory of a setup screen displayed on a large-size display of the digital mixer.

Once the user performs predetermined operation, a setup screen of FIG. 4 is displayed on the large-size display 14. In the figure, 206 represents a CASCADE ON/OFF button that switches between ON/OFF states of the cascade input/output in a toggle-like manner. Cascade-input-model selecting box 202 is provided for selecting another mixer (“cascaded-to mixer”) from which cascade signals are to be input to the instant embodiment of the digital mixer. Cascade-output-model selecting box 210 is provided for selecting another mixer (“cascaded-to mixer”) to which cascade signals are to be output from the instant embodiment of the digital mixer. Cascade-input-mode selecting box 204 is provided for selecting a “cascade input mode” that specifies a switching state of the input logical channel setting section 104, while a cascade-output-mode selecting box 208 is provided for selecting a “cascade output mode” that specifies a switching state of the output logical channel setting section 122. Block diagram display section 212 displays a block diagram for briefly depicting signal flaws in accordance with the cascade input/output mode.

Details of the cascade input/output models and cascade input/output modes, which can be selected by the above-mentioned selecting boxes, will be described with reference to FIG. 5. In the figure, an “input/output models” section indicates input/output models that can be selected via the cascade-input/output-model selecting boxes 202 and 210. Here, “Model A” is the model of the instant embodiment of the digital mixer as noted earlier, and “Model B” is the model of another identified digital mixer. Further, “MIXER32BUS” is also an unidentified model where the number of the cascade input/output channels is “32” or less, and “MIXER16BUS” is an unidentified model where the number of the cascade input/output channels is “16” or less.

Figures 5, 6:
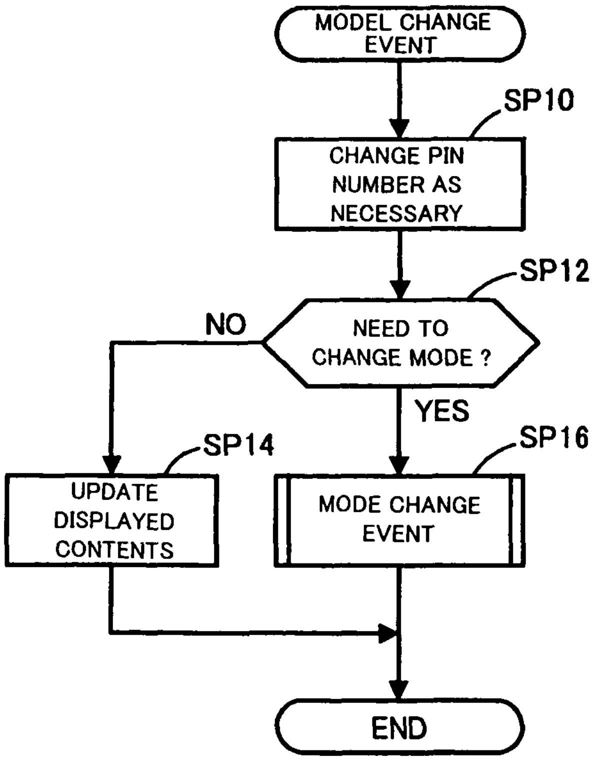
FIG. 5 is a diagram showing correspondency between cascade input/output models and cascade input/output modes.
FIG. 6 is a flow chart of an input/output model change event routine performed in the digital mixer.

In an “input/output mode” of FIG. 5, there are enumerated input/output modes that can be selected by the cascade-input/output-mode selecting boxes 204 and 208. Here, a “cascade” mode represents an input/output mode in which the cascade input/output logical channels are assigned directly to the cascade input/output physical channels. “SLOT4” mode represents an operation mode in which the normal input/output physical channels corresponding to the fourth input/output slots are assigned to the cascade input/output logical channels and the cascade input/output physical channels are assigned to the normal input/output logical channels corresponding to the fourth input/output slots. Further, a “SLOT3/4” mode represents an operation mode in which the normal input/output physical channels corresponding to the third and fourth input/output slots are assigned to the cascade input/output logical channels and the cascade input/output physical channels are assigned to the normal input/output logical channels corresponding to the third and fourth input/output slots.

Further, a “SLOT1-4[CH1-8]” mode represents an operation mode in which the normal input/output physical channels corresponding to the respective first to eighth channels of the first to fourth input/output slots are assigned to the cascade input/output logical channels and the cascade input/output physical channels are assigned to the normal input/output logical channels corresponding to the first to eighth channels of the first to fourth input/output slots. Furthermore, a “SLOT1-4[CH9-16]” mode represents an operation mode in which the normal input/output physical channels corresponding to the respective ninth to sixteenth channels of the first to fourth input/output slots are assigned to the cascade input/output logical channels and the cascade input/output physical channels are assigned to the normal input/output logical channels corresponding to the ninth to sixteenth channels of the first to fourth input/output slots. Note that the terms “input/output”, used for convenience of description of to the instant embodiment, mean “input or output”, and that the setting states of the input logical channel setting section 104 and output logical channel setting section 122 are independent of each other and do not impose any restriction on each other.

In FIG. 5, each of rectangular boxes at intersections between the input/output model names and the input/output mode names indicates whether the input/output mode is selectable (“○”) or not selectable (“X”) with the input/output model. Referring first to the “MIXER32BUS” model, the “cascade” mode is not selectable with this model. Namely, because “MIXER32BUS” does not indicate any specific model, it is impossible to identify signals (or buses) assigned to the individual cascade input/output physical channels, and thus it is inappropriate to input/output such signals directly to/from the buses 110-116. Also, with the “MIXER32BUS” model, the “SLOT4” mode is not selectable either. This is because the maximum number of the channels, to/from which each one of the slots can input/output sound signals, is “16” and thus all of the “32” channels can not be assigned to the slot. With the “MIXER32BUS” model, all of the other input/output modes than the above-mentioned two modes are selectable.

With the “MIXER16BUS” model, only the “SLOT4” mode is selectable, and the other modes are not selectable. The reason why the “cascade” mode is made non-selectable is the same as in the case of the “MIXER32BUS” model, and the reason why the other modes are made non-selectable is that the “MIXER32BUS” model can be used in place of the “MIXER16BUS” model. Namely, even where the number of the cascade input/output channels of another mixer to be connected with the instant embodiment is “16” or less, the “MIXER32BUS” model may be safely selected, and thus cascade signals of the “16” channels can be input/output dispersedly via a plurality of the input/output slots.

With “MODEL A”, only the “cascade” mode is selectable. This means that, where the other mixer is actually of “Model A”, the cascade connection via an input/output card is not impossible. Namely, the cascade-input/output-model selecting box 202 or 210 may select “MIXER32BUS” even where the other mixer is actually of “Model A”, and thus such model selection permits the cascade connection via the input/output card. If the mixers of “MODEL A” are cascaded in the “cascade” mode, control signals specific to “MODEL A” can be input/output between the mixers.

With “MODEL B”, the “SLOT3/4” mode, “SLOT1-4”, “SLOT1-4[CH1-8]” mode and “SLOT1-4[CH9-16]” mode are selectable, as in the case of the “MIXER32BUS” model. The “cascade” mode is also selectable with “MODEL B”. Because “MODEL B” is an identified model that is different from “MODEL A”, it is already known to which one of the buses 160-116 each of the sound signals of the PIN-specific cascade input/output channels actually corresponds. Thus, by changing the pin numbers via the PIN change sections 102 and 124, “MODEL B” also permits substantially the same cascade connection as in the case where “MODEL A” is connected.

3.2. Selection of Connected-to Model:

Once any one of the cascade-input/output-model selecting boxes 202 and 210 is clicked via the mouse, a popup window, listing the selectable input/output models, is displayed below the clicked or operated selecting box 202 or 210, so that the user is allowed to newly select an input/output model. Once the user changes the input/output model on the popup window, an input/output model change event routine of FIG. 6 is started up. At step SP10 of the input/output model change event routine of FIG. 6, any of the pin numbers is changed via the PIN change section 102 or 124 as necessary. Specifically, “as necessary” means a case when “Model B” has been changed over to another model via the cascade-input/output-model selecting box 202 or 210 or another model has been changed over to “Model B”.

In the instant embodiment of the digital mixer, there are prestored data indicative of the correspondence between the buses and pins in each of Model A and Model B, i.e. data indicative of the relationship between the pin numbers of the cascade input/output terminals, namely, which one of the cascade input/output physical channels each of the PIN-specific cascade input/output channels corresponds. The PIN change operation at step SP10 is carried out using the prestored data.

At following step SP12, a determination is made as to whether there has arisen a need to change the input/output mode, i.e. whether the input/output mode that was being selected prior to the model change is not selectable with the changed model (i.e., newly-selected model). With a NO determination (i.e., selectable with the changed model: “○”), the routine goes to step SP14, where the display of the operated cascade-input/output-model selecting box 202 or 210 is changed or updated into contents corresponding to the changed or newly-selected model. With a YES determination (i.e., non-selectable with the changed model: “X”), the routine goes to step SP16, where any one of the input/output modes selectable in the model in question is selected compulsorily, so that a mode change event routine of FIG. 7 is started up.

3.3. Selection of Input/Output Mode:

Once any one of the cascade-input/output-mode selecting boxes 204 and 208 is clicked via the mouse, a popup window, listing the selectable input/output modes, is displayed below the clicked or operated selecting box 204 or 208, so that the user is allowed to newly select an input/output mode. Once the user changes the input/output mode on the popup window, the input/output mode change event routine of FIG. 7 is started up. The input/output mode change event routine is also started up when the above-described operation at step SP16 of FIG. 6 has been executed.

Figure 7:
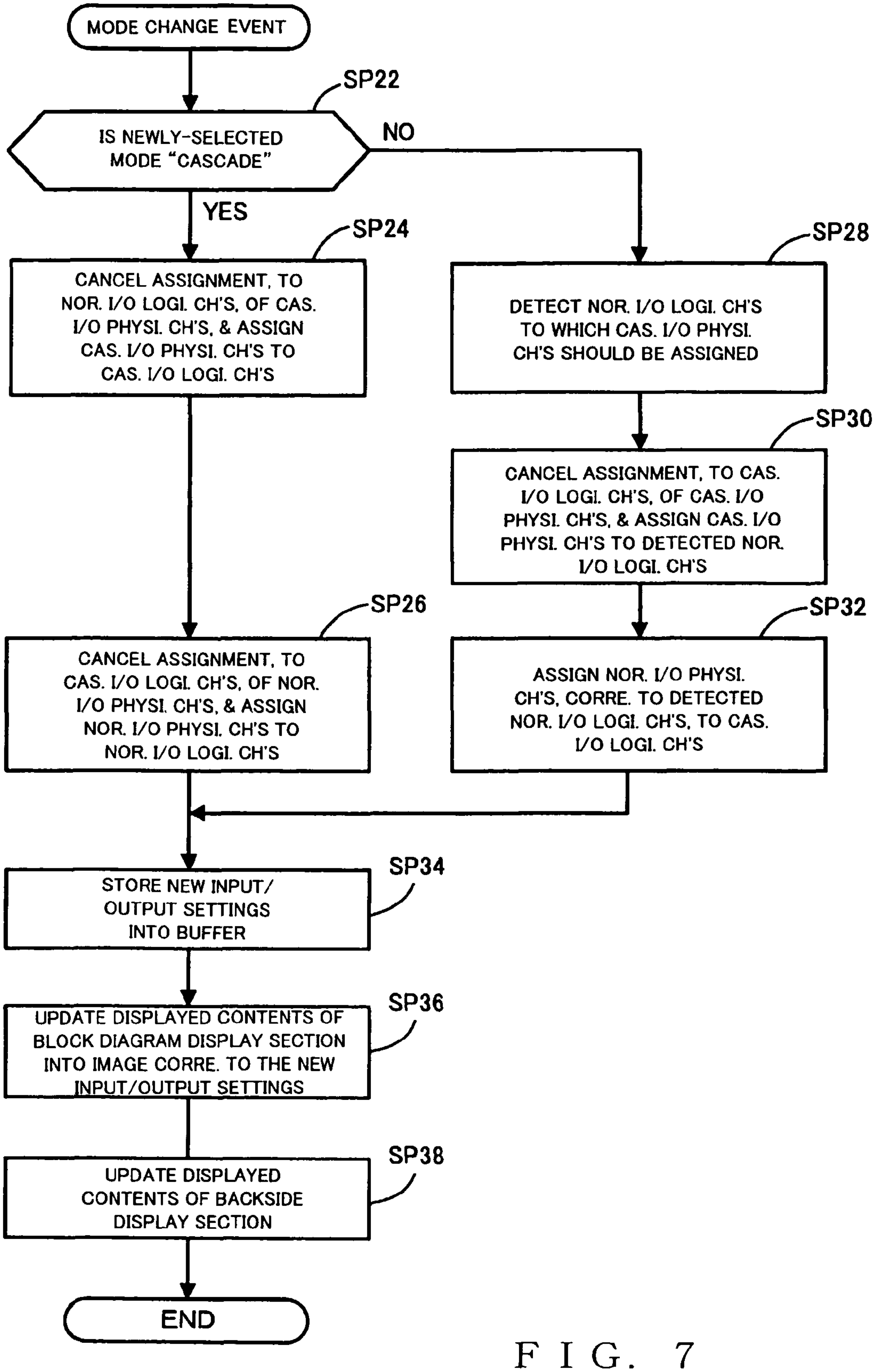
FIG. 7 is a flow chart of a mode change event routine performed in the digital mixer.

At following step SP22 of FIG. 7, a determination is made as to whether the newly-selected input/output mode is the “cascade” mode. With a YES determination, the routine proceeds to step SP24, where the assignment, to the normal input/output logical channels (“NOR. I/O LOGI. CH’S”), of the cascade input/output physical channels (“CAS. I/O PHYSI. CI’S”) is canceled and instead the cascade input/output physical channels (“CAS. I/O PHYSI. CH’S”) are assigned to the cascade input/output logical channels (“CAS. I/O LOGI. CH’S”) via one of the input/output logical channel setting sections 104 and 122. At next step SP26, the assignment, to the cascade input/output logical channels (“CAS. I/O LOGI. CH’S”), of the normal input/output physical channels (“NOR. I/O PHYSI. CH’S”) is canceled and instead the normal input/output physical channels (“NOR. I/O PHYSI. CH’S”) are assigned to the normal input/output logical channels (“NOR. I/O LOGI. CH’S”).

If, on the other hand, the newly-selected input/output mode is a mode other than the “cascade” mode, a NO determination is made at step S22, so that the routine branches to step SP28. At step SP28, in accordance with the selected input/output mode, a detection is made of the normal input/output logical channels (“NOR. I/O LOGI. CH’S”) to which the cascade input/output physical channels (“CAS. I/O PHYSI. CH’S”) should be assigned. At following step SP30, the assignment, to the cascade input/output logical channels (“CAS. I/O LOGI. CH’S”), of the cascade input/output physical channels (“CAS. I/O PHYSI. CH’S”) is canceled and instead the cascade input/output physical channels (“CAS. I/O PHYSI. CH’S”) are assigned to the detected normal input/output logical channels (“NOR. I/O LOGI. CH’S”) via one of the input/output logical channel setting sections 104 and 122. At next step S32, the normal input/output physical channels corresponding to the detected normal input/output logical channels are assigned to the cascade input/output logical channels. Here, the normal input/output physical channels corresponding to the other normal input/output logical channels than the normal input/output logical channels detected at step SP28 are assigned to corresponding ones of the normal input/output physical channels (i.e., normal input/output physical channels of the same numbers).

Upon completion of the operation of step SP26 or SP32 above, the routine moves on to step SP34, where new input/output setting states of the input/output logical channel setting section 104 or 122 are stored into a predetermined buffer area of the RAM 22. At next step SP36, the displayed contents of the block diagram display section 212 are updated in accordance with the newly-selected input/output mode. At following step SP38, the displayed contents of the backside display section 13 are updated in accordance with the newly-selected input/output mode; that is, the LED corresponding to the newly-selected input/output mode is illuminated, while the LEDs corresponding to the other modes are turned off.

Now, details of the updating of the block diagram display section 212 at step SP36 above are described. The block diagram display section 212, as illustrated in FIG. 4, includes an input stage display section 212*a*, and an output stage display section 212*b*. The block diagram display section 212 of FIG. 4 indicates that the “SLOT4” mode has been selected as the input mode and the “SLOT1-4[CH9-16]” mode has been selected as the output mode. In the illustrated example of FIG. 4, “SLOT4”, “CASCADE IN” and “SLOT1-3” on a left area of the input stage display section 212*a* each represents "input physical channels", while "CASCADE IN" and "SLOT IN" on a right area of the input stage display section 212*a* each represents "input logical channels". Arrows connecting the left and right areas of the input stage display section 212*a* indicate correspondency between the two areas.

Figure 8A:
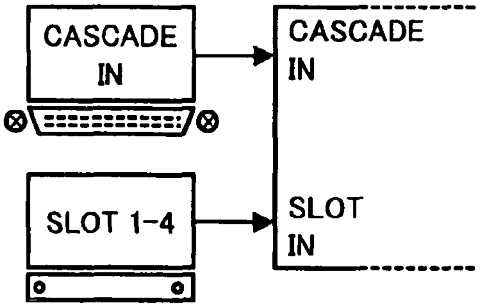
FIGS. 8A-8E are diagrams showing various changes in the setup screen corresponding to various input/output modes.
Figure 8B:
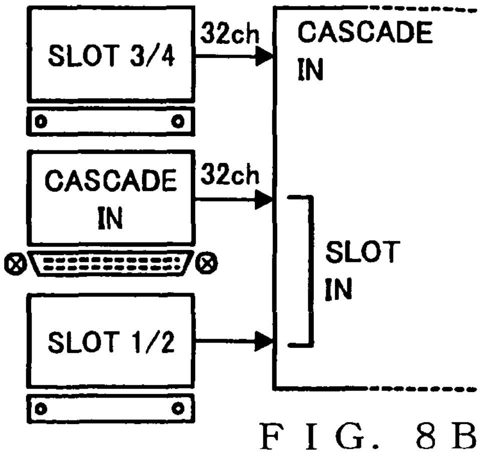
Figure 8C:
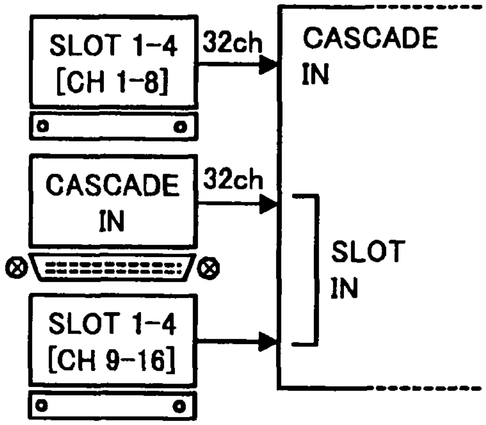
Figure 8D:
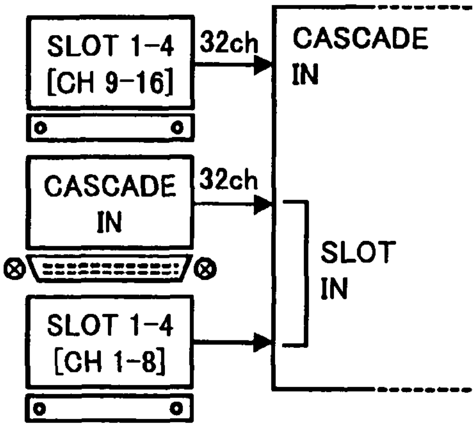

Once the "cascade" mode is selected as the input mode, the input stage display section 212*a* is set to such displayed contents as illustrated in FIG. 8A, from which it can be seen that the cascade input physical channels correspond to the cascade input logical channels and the normal input physical channels correspond to the normal input logical channels. Other displayed contents of the input stage display section 212*a* when the "SLOT3/4" mode, "SLOT1-4[CH1-8]" mode and "SLOT1-4[CH9-16]" mode have been selected as the input mode are illustrated in FIGS. 8B, 8C and 8D, respectively.

Figure 8E:
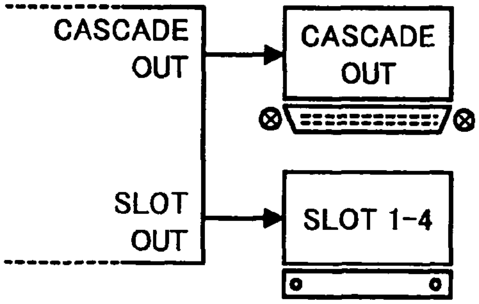

The displayed contents of the output stage display section 212*b* are set in a similar manner to those of the input stage display section 212*a*. Namely, in the illustrated example of FIG. 4, "SLOT1-4" and "CASCADE OUT" on a right area of the output stage display section 212*b* each represents "output physical channels", while "CASCADE OUT" and "SLOT OUT" on a left area of the output stage display section 212*b* each represents "output logical channels". Arrows connecting the left and right areas of the output stage display section 212*b* indicate correspondency between the two areas. Once the "cascade" mode is selected as the output mode, the output stage display section 212*b* is set to such displayed contents as illustrated in FIG. 8E, from which it can be seen that the cascade output physical channels correspond to the cascade output logical channels and the normal output physical channels correspond to the normal output logical channels. When any one of the other output modes has been selected, a state of the assignment between the output physical channels and the output logical channels is displayed on the output stage display section 212*b* in a manner similar to FIG. 8B, 8C or 8D.

Further, on the block diagram display section 212, there is displayed an image indicative of outer appearances of the input/output terminals corresponding to the input/output physical channels, adjacent to blocks representing the input/output physical channels. Referring back to FIG. 4, reference numerals 214 and 218 represent input slot images that are displayed adjacent to blocks representing the fourth input slot and first to third input slots. 216 represents a cascade input terminal image displayed adjacent to the "CASCADE IN" block. Similarly, on the output stage display section 212*b*, there are displayed a cascade output terminal image 220 adjacent to the "CASCADE OUT" block, and an output slot image 222 adjacent to blocks representing the first to fourth input slots. Thus, with the images indicative of the appearances of the input and output terminals, the user is allowed to grasp at a glance the functions of the individual input and output terminals, so that it is possible to effectively avoid inconveniences, such as wiring errors etc.

Figure 9:
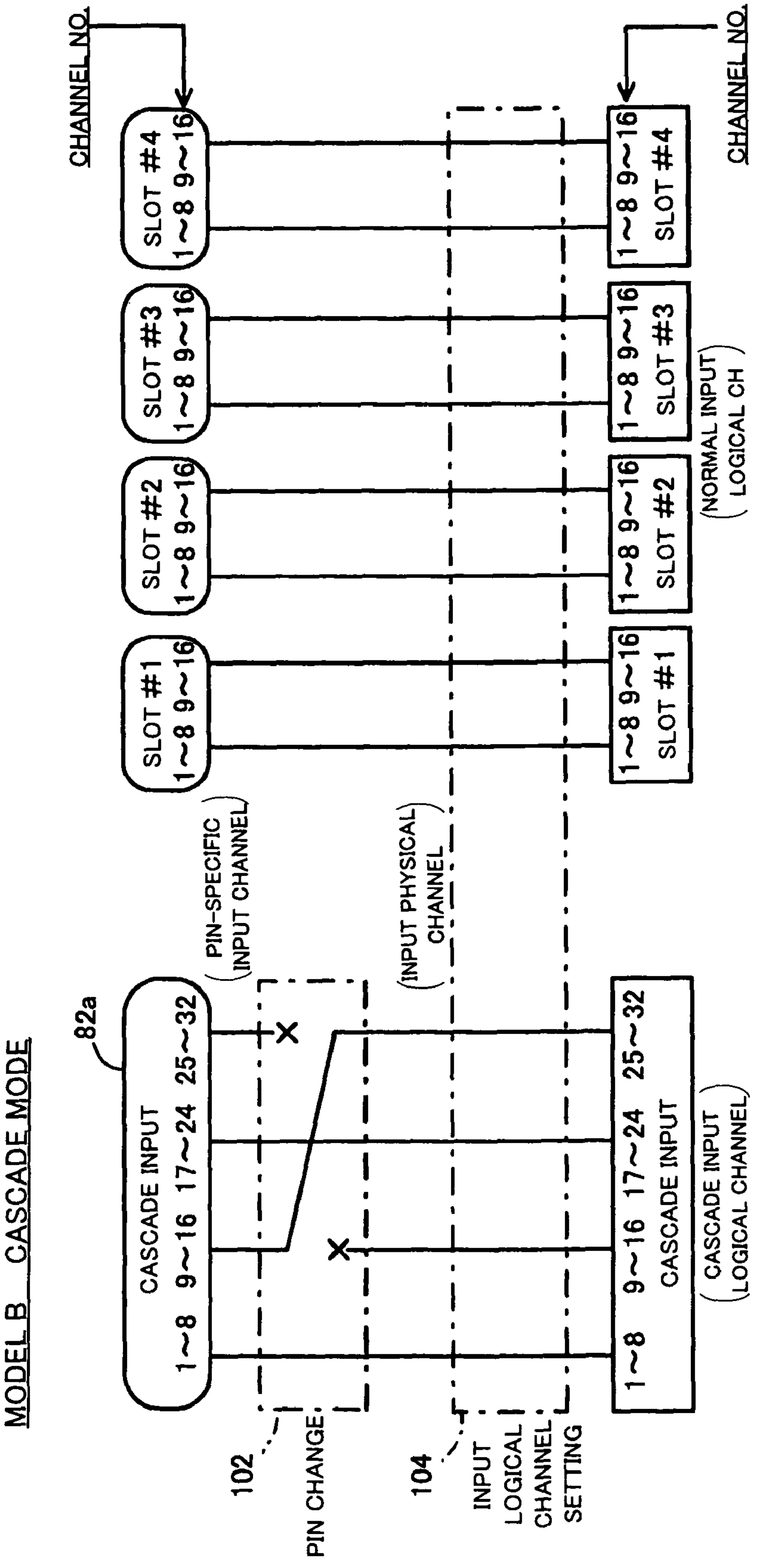
FIG. 9 is a diagram showing connecting relationship when "Model B" and "cascade" mode have been selected.
Figure 10:
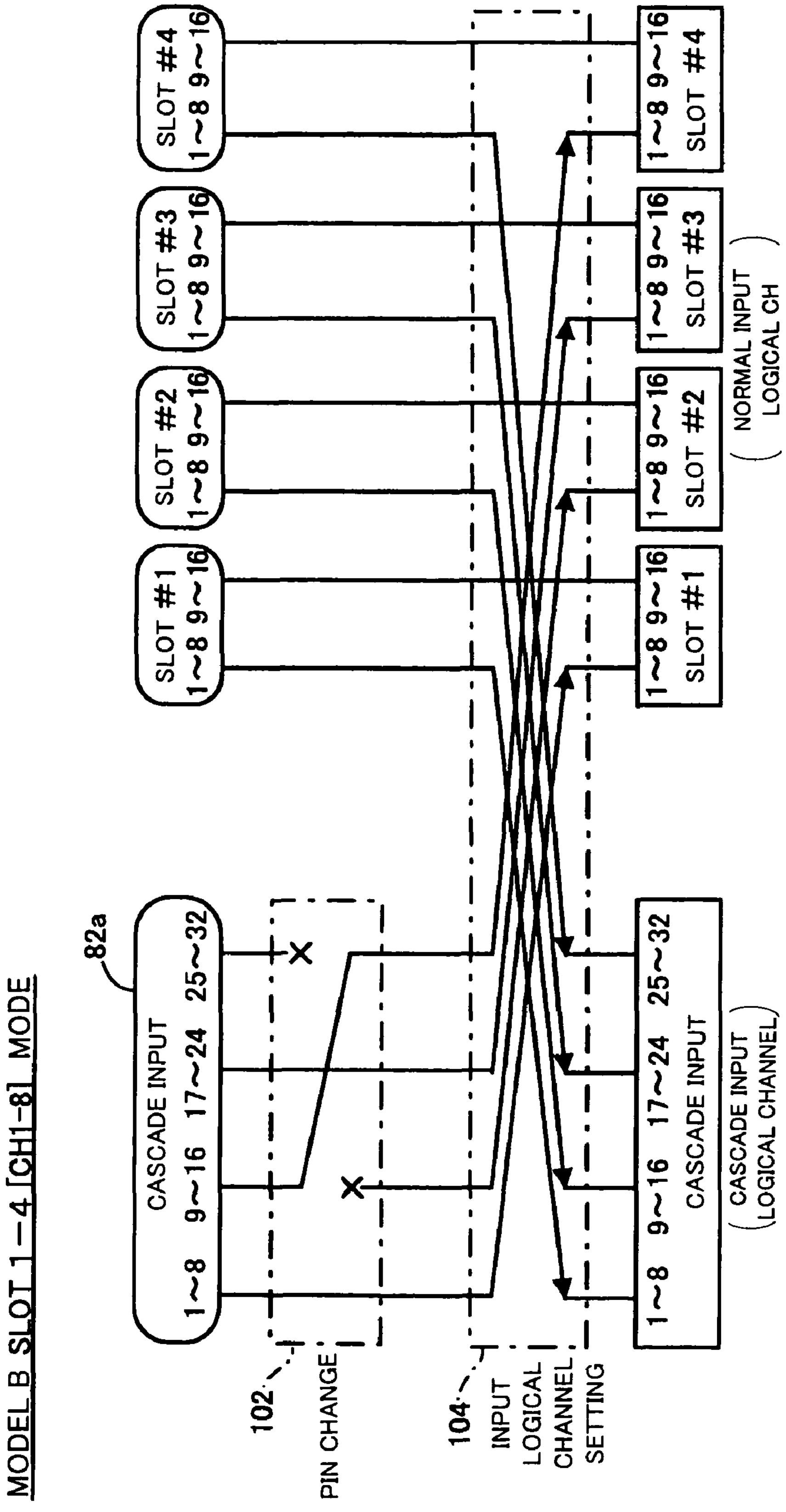
FIG. 10 is a diagram showing connecting relationship when "Model B" and "SLOT1-4[CH1-8]" mode have been selected.

3.4. Specific Example of Connection Operation:

Next, a description will be given about specific examples of connecting relationship between the PIN change section 102 and the input logical channel setting section 104 corresponding to the input-side connected-to model and input mode, with reference to FIGS. 9-13. First, FIG. 9 shows an example of the connecting relationship when "Model B" has been selected as the input-side connected-to model and the "cascade" mode as the input mode. Namely, in response to the selection of "Model B" as the input-side connected-to model, the pin number changing operation is carried out via the PIN change section 102, and the cascade input physical channels are set so that the arrangement of the pins (channel numbers) after the pin number change becomes similar to that of "Model A". Then, the cascade input physical channels and the cascade input logical channels are associated with each other in one-to-one relation, and the normal input physical channels and the normal input logical channels are associated with each other in one-to-one relation, FIG. 10 shows another example of the connecting relationship when "Model B" has been selected as the input-side connected-to model and the "SLOT1-4[CH1-8]" mode as the input mode. As in the case of FIG. 9, the pin number changing operation is carried out in the PIN change section 102. Also, in the input logical channel setting section 104, the cascade input physical channels after the pin number change are associated with the normal input logical channels corresponding to the respective first to eighth channels of the first to fourth slots, and the normal input logical channels corresponding to the respective first to eighth channels of the first to fourth slots are associated with the 1st to 32nd cascade input logical channels.

Figure 11:
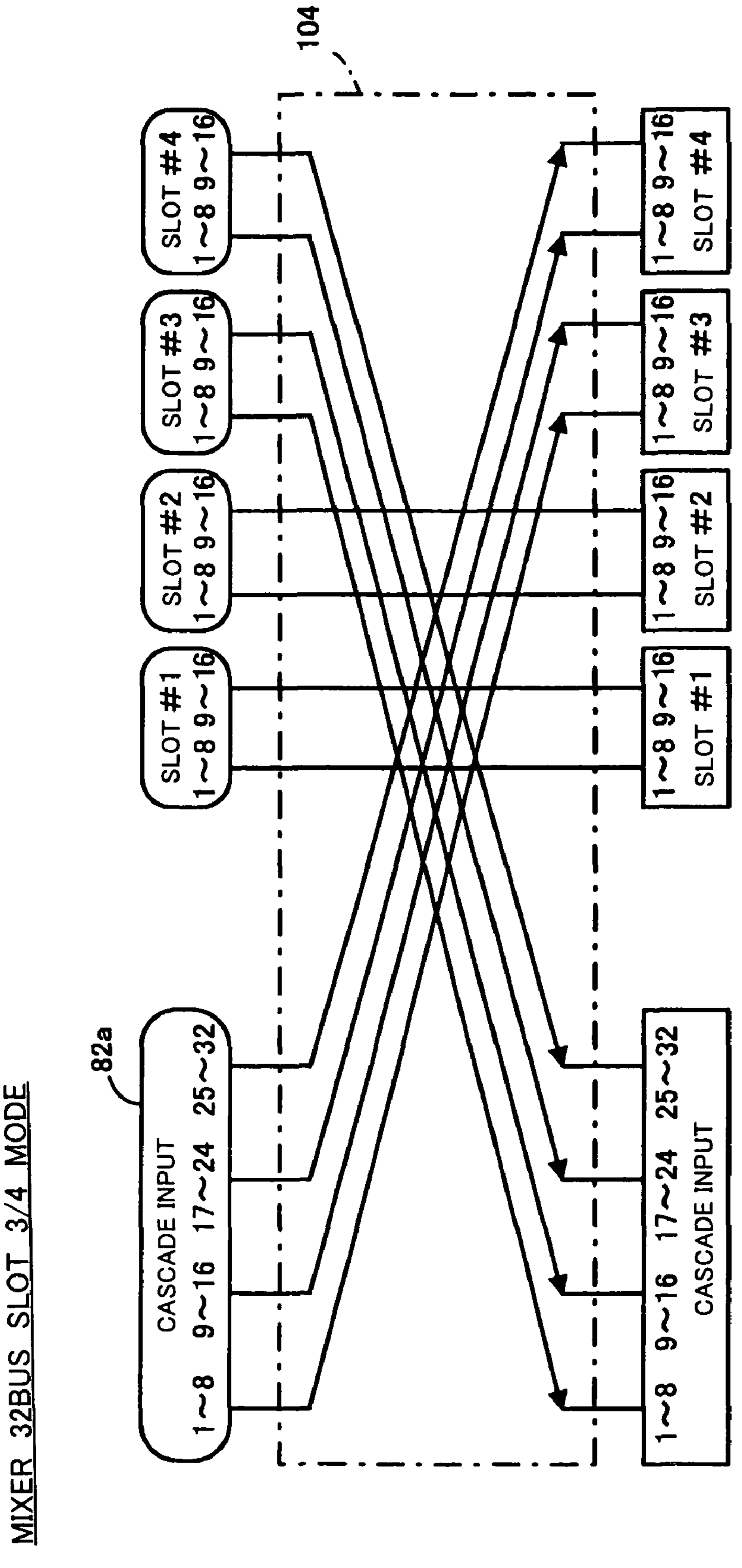
FIG. 11 is a diagram showing connecting relationship when a "MIXER32BUS" model and "SLOT3/4" mode have been selected.

FIG. 11 shows still another example of the connecting relationship when "MIXER32BUS" has been selected as the input-side connected-to model and the "SLOT3/4" mode as the input mode. Note that illustration of the PIN change section 102 is omitted in FIGS. 11-13 because no pin number change takes place in the change section 102 in the examples of FIGS. 11-13. In the illustrated example of FIG. 10, the 1st to 32nd cascade input physical channels are associated with the normal input logical channels corresponding to the respective 1st to 16th channels of the third and fourth slots, and the normal input physical channels corresponding to the respective 1st to 16th channels of the third and fourth slots are associated with the 1st to 32nd cascade input physical channels. For the first and second slots, the individual normal input physical channels are directly associated with the normal input logical channels.

Figure 12:
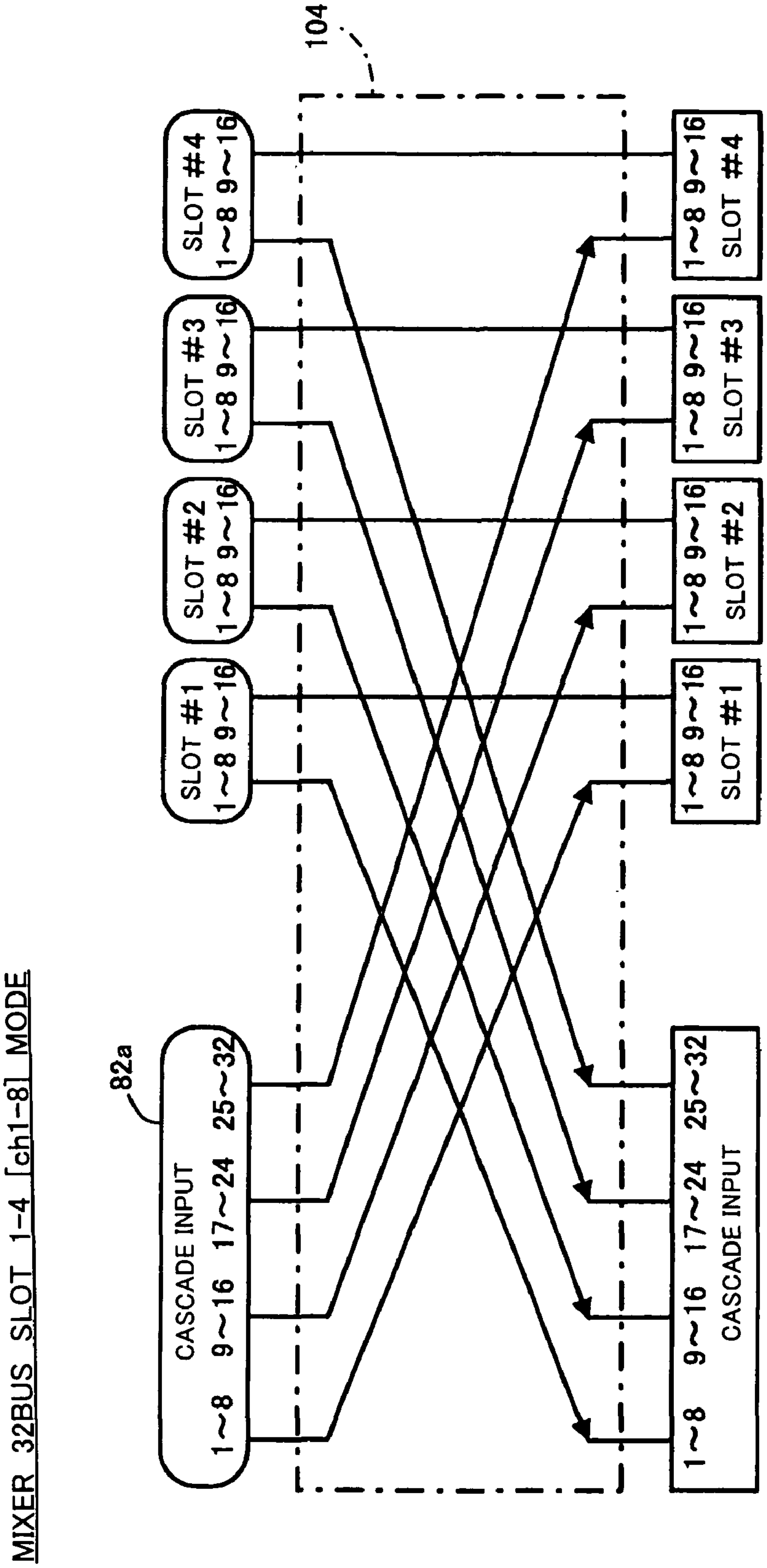
FIG. 12 is a diagram showing connecting relationship when the "MIXER32BUS" model and "SLOT1-4[CH1-8]" mode have been selected.

FIG. 12 shows still another example of the connecting relationship when "MIXER32BUS" has been selected as the input-side connected-to model and the "SLOT1-4[CH1-8]" mode as the input mode. In the illustrated example of FIG. 12, the 1st to 32nd cascade input physical channels are associated with the normal input logical channels corresponding to the respective first to eighth channels of the first to fourth slots, and the normal input physical channels corresponding to the respective first to eighth channels of the first to fourth slots are associated with the 1st to 32nd cascade input logical channels. The normal input physical channels corresponding to the respective 9th to 16th of the first to fourth slots are directly associated with the normal input logical channels.

Figure 13:
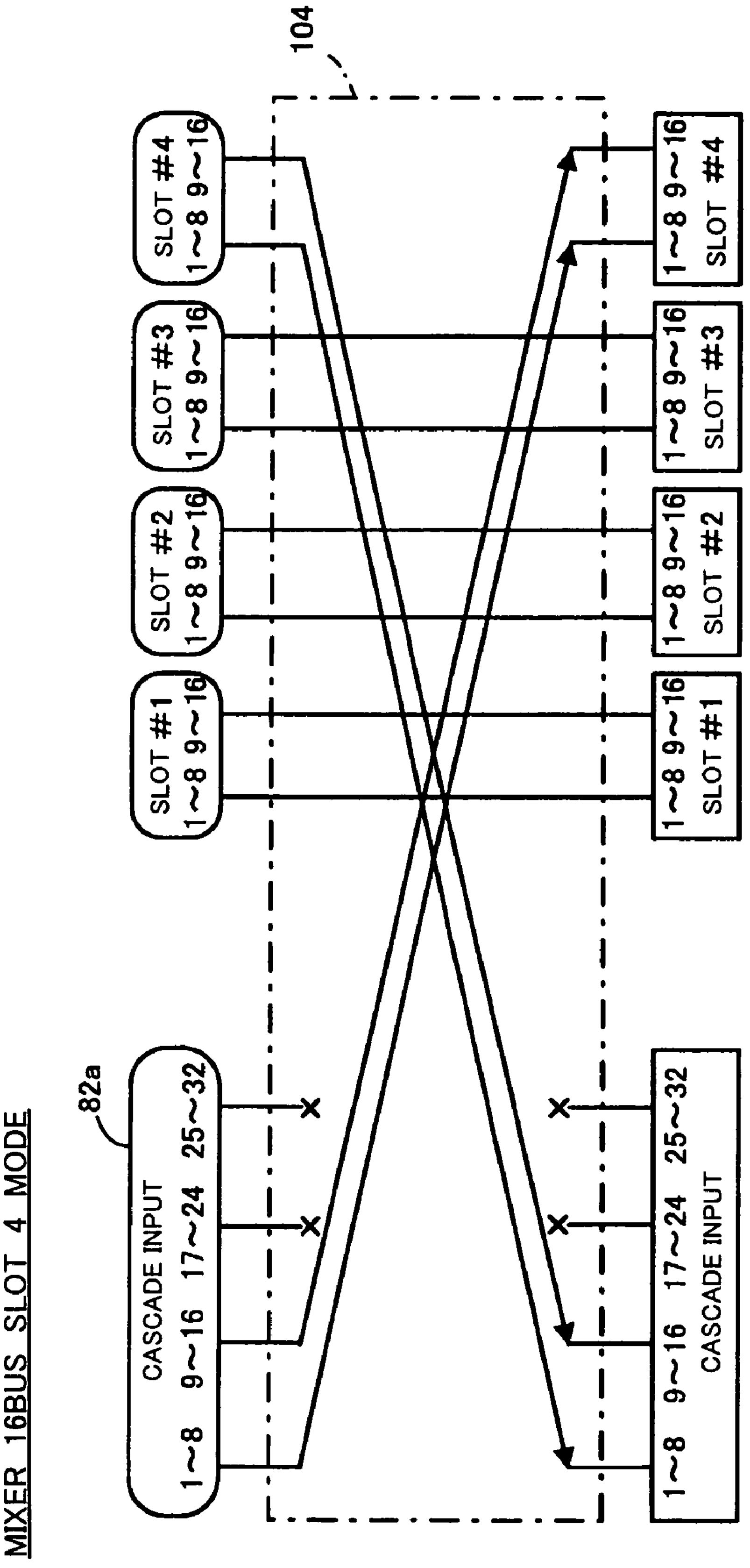
FIG. 13 is a diagram showing connecting relationship when a "MIXER16BUS" model and "SLOT4" mode have been selected.

FIG. 13 shows still another example of the connecting relationship when "MIXER16BUS" has been selected as the input-side connected-to model and the "SLOT4" mode as the input mode. In the illustrated example of FIG. 13, the 1st to 16th cascade input physical channels are associated with the normal input logical channels corresponding to the respective 1st to 16th channels of the fourth slot, and the normal input physical channels corresponding to the respective 1st to 16th of the first slot are associated with the 1st to 16th cascade input logical channels. Note that the 17th to 32nd cascade input logical channels are "vacant" in this case. The normal input physical channels of the first to third slots are directly associated with the normal input logical channels.

Whereas various examples of the connecting relationship between the input-side PIN change section 102 and the input logical channel setting section 104 have been described above, connecting relationship between the output-side PIN change section 124 and the output logical channel setting section 122 is set in a similar manner to the above-described in accordance with a selected output-side connected-to model and output mode.

Figure 14:
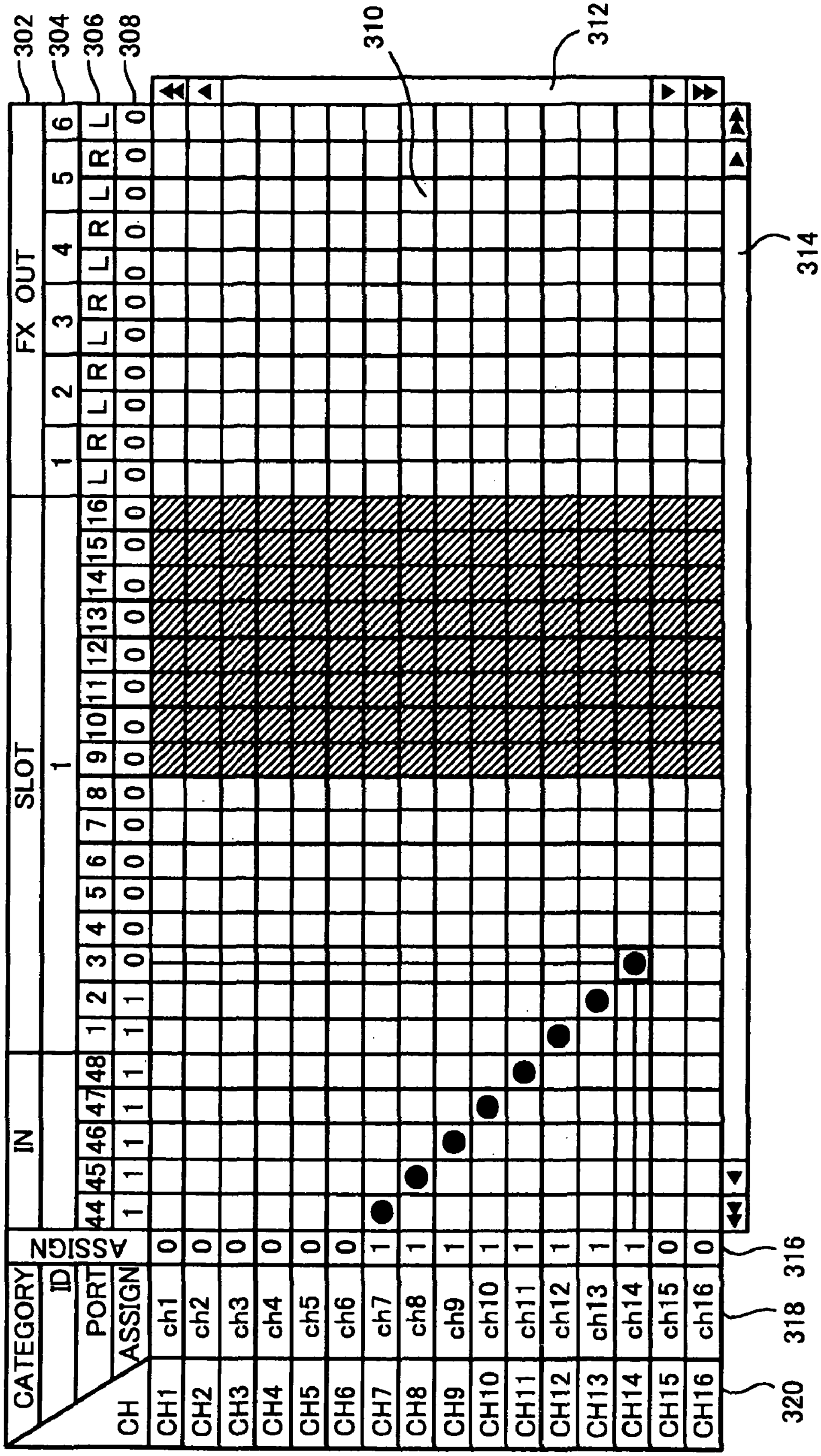
FIG. 14 is a diagram showing an input patch setting screen displayed on the large-size display.
Figure 15:
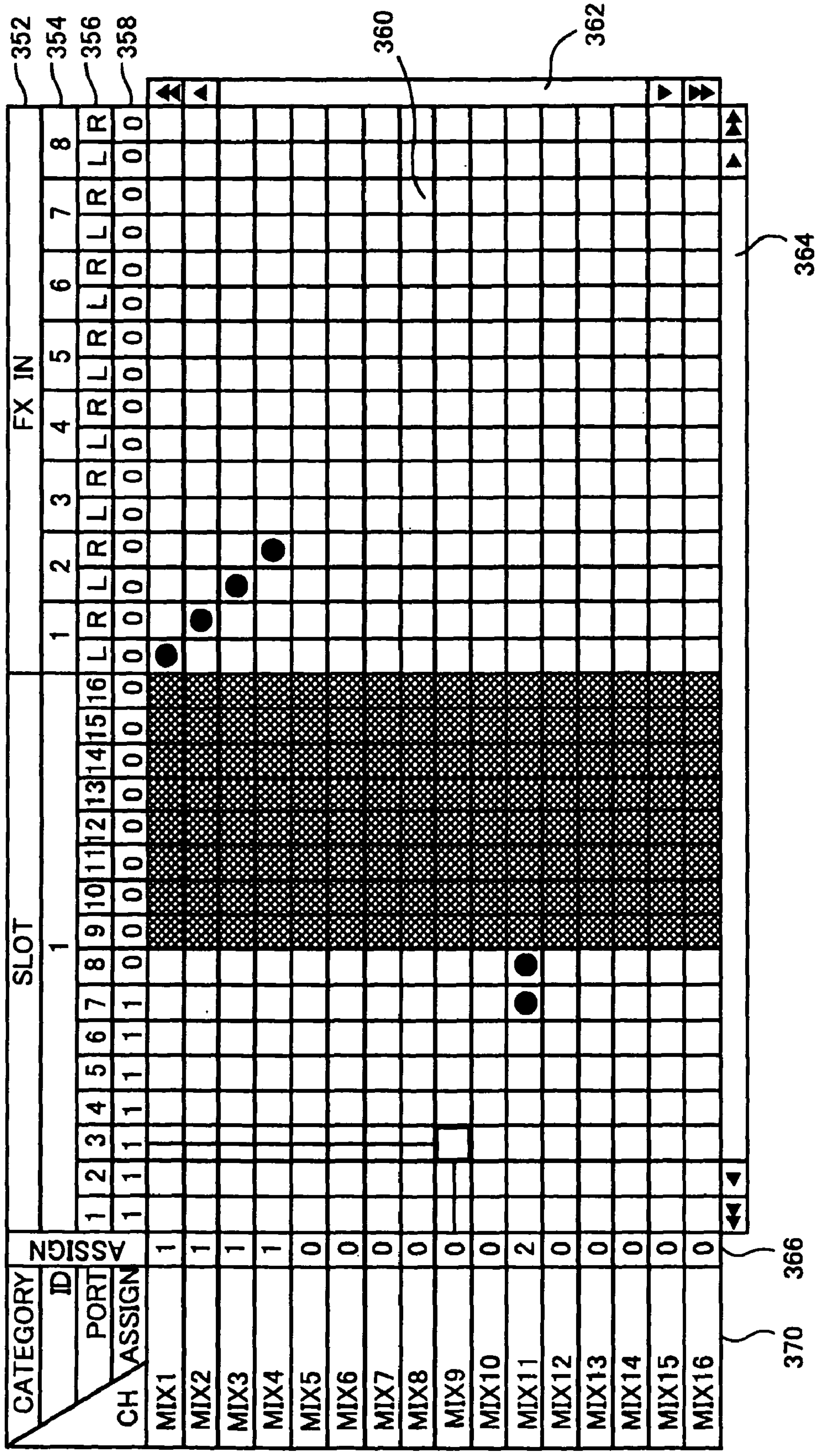
FIG. 15 is a diagram showing an output patch setting screen displayed on the large-size display.

3.5. Display of Input/Output Patch Setting Screen:

Once the user perform predetermined operation in order to make settings for the input patch section 106 or output patch section 120, an input patch setting screen of FIG. 14 or output patch setting screen of FIG. 15 is displayed on the large-size display 14. Example contents of these screens are described below. First, on the input patch setting screen of FIG. 14, 302 represents an input category display section that displays a type (category) of means for supplying sound signals of the normal input logical channels to the input patch section 106. Portion labeled "SLOT" corresponds to any one of the first to fourth slots. ID number display section 304 displays an ID number of the sound signal supply means belonging to the category. For example, ID numbers "1"-"4" are assigned to the first to fourth slots, respectively.

306 represents a channel number display section that displays channel numbers of the normal input logical channels of the input means identified by the above-mentioned "category" and "ID number". Assignment state display section 308 displays a value "1" when the corresponding normal input logical channel of the identified input means is currently assigned to any one of the input mixing channels, but displays a value "0" when the corresponding normal input logical channel of the identified input means is currently assigned to none of the input mixing channels.

Channel name display section 320 displays "channel names" assigned to the input mixing channels. CHANNEL NAME CHANGE button 318 displays a "channel number" of each of the input mixing channels, and, one this button 318 is clicked via the mouse, a popup window to be used for changing the "channel name" is displayed. Assignment state display section 316 displays a value "1" when the corresponding input mixing channel is currently assigned to any one of the normal input logical channels, but displays a value "0" when the input mixing channel is currently assigned to none of the normal input logical channels.

Grid display section 310 displays a matrix grid by the vertical axis corresponding to the input mixing channels and the horizontal axis corresponding to the normal input logical channels. Each small rectangular block with a "●" mark therein indicates that the normal input logical channel specified on the horizontal axis is assigned to the input mixing channel specified on the vertical axis. Here, once the user clicks any one of the blocks via the mouse and depresses the "ENTER" key on the keyboard, the assignment state is changed so that the normal input logical channel is assigned to the input mixing channel corresponding to the clicked block. 312 and 314 represent scroll bars for vertically scrolling the grid display section 310.

On the output patch setting screen of FIG. 15, 352 represents an output category display section, 354 an ID number display section, 356 a channel number display section and 358 an assignment state display section, which display information of the normal output logical channel in a similar manner to the above-described components 302-308 of the input patch setting screen of FIG. 14. Further, 370 represents a channel name section and 366 an assignment state display section, which display information of the normal output logical channel in a similar manner to the above-described channel name display section 320 and assignment state display section 316 of the input patch setting screen of FIG. 14. However, because the channel names of the normal output logical channels are fixed, there is provided no button corresponding to the CHANNEL NAME CHANGE button 318. Further, 360 represents a grid display section, which displays assignment, to the output mixing channels, of the normal output logical channels. 362 and 364 represent scroll bars to be used for vertically scrolling the grid display section 360.

Figure 16:
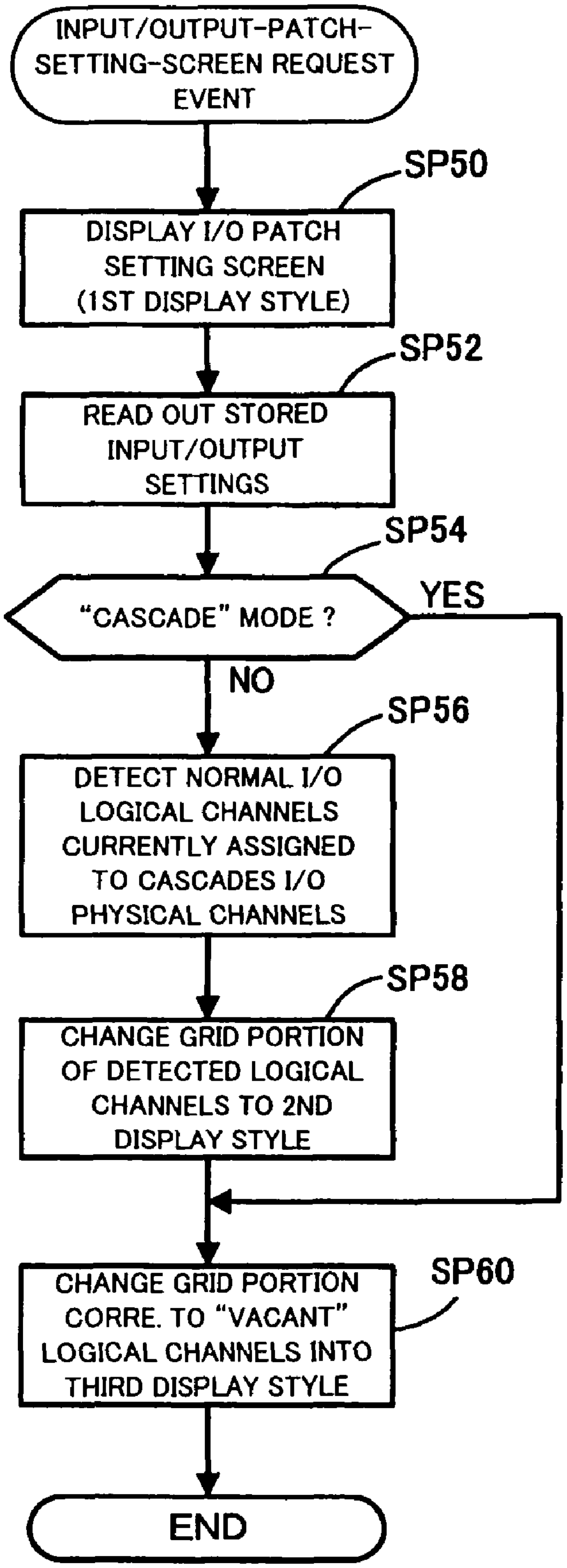
FIG. 16 is a flow chart of an input/output-patch-setting-screen request event routine performed in the digital mixer.

Now, a description will be given about operations when the input patch setting screen of FIG. 14 or output patch setting screen of FIG. 15 is to be displayed. First, once the user performs predetermined operation for displaying any one of these screens, an input/output-patch-setting-screen request event routine of FIG. 16 is started up. At step SP50 of the screen request event routine, the desired one of the patch setting screens of FIG. 14 and FIG. 15 is displayed on the large-size display 14, at which time the grid display section 310 or 360 is displayed in a first display style (e.g., with blue background color).

At next step SP52, the input/output settings stored in the RAM 22 (see FIG. 7, step SP34) are read out. At following step SP54, a determination is made as to whether or not the current input/output mode is the "cascade" mode. With a NO determination, the routine goes to step SP56, and a search is made for the normal input/output logical channels currently assigned to the cascade input/output physical channels. At following step SP58, the grid portion of the grid display section 310 or 360, corresponding to the detected normal input/output logical channels, is changed into a second display style.

For example, the second display style may be implemented here by displaying the background in yellow; however, in the illustrated example of FIG. 14, the second display style is indicated by "hatching". Because, in the illustrated example of FIG. 14, the 9th to 16th channels of the first input slot are indicated in the second display style, the user can ascertain at a glance that the sound signals of such normal input logical channels are actually supplied from the cascade input terminal 82*a*.

At following step SP60 of the screen request event routine of FIG. 16, a grid portion corresponding to "vacant" normal input/output logical channels is changed to a third display style. For example, the third display style may be implemented by displaying the background in gray; however, in the illustrated example of FIG. 15, the third display style is indicated by "crosshatchings". Because, in the illustrated example of FIG. 15, the 9th to 16th channels of the first output slot are indicated in the third display style, the user can ascertain at a glance that any sound signal can not be actually outputted from such normal output logical channels.

4. Modification

The present invention is not limited to the above-described embodiment, and various modifications of the present invention are also possible as exemplified below.

(1) Whereas the embodiment has been described above as inputting and outputting sound signals of the normal input and output physical channels via the "slots" and "input and output cards", the basic principles of the present invention may of course be applied to mixers where sound signals are input and output via mere "input and output terminals" without using the "slots" and "input and output cards".

(2) Further, the input and output logical channel setting sections 104 and 122 have been described as collectively switching the paths of a plurality of input or output channels within a given range. In an alternative, these setting sections 104 and 122 may be constructed to freely switch the path for each of the input or output channels.

(3) Furthermore, the embodiment has been described above in relation to the case where the candidate "models"

displayed in the selecting boxes 202 and 210 are the same for both of the "input" and "output" and the candidate "modes" displayed in the selecting boxes 204 and 208 are the same for both of the "input" and "output". However, the "models" or "modes" need not necessarily be the same for both "input" and "output"; for example, arrangements may be made such that the user can select a particular "model" or "mode" to be applied to only one of the "input" and "output".

(4) Whereas the above-described embodiment is arranged to allow the user to select a desired input/output mode within the range illustrated in FIG. 5 irrespective of present/absence and type of any input/output card actually inserted in the input/output slot, arrangements may be made such that the candidate input/output modes selectable by the user can be changed in accordance with the present/absence and type of any input/output card actually inserted.

(5) Furthermore, in the above-described embodiment, a sound signal of one channel is input/output via each of the pins provided in the cascade input/output terminal or slot terminal. In an alternative, sound signals of a plurality of channels may be input/output via each or selected one of the pins. Irrespective of how sound signals to be communicated via the pins are assigned to the pins, it is only necessary, for the cascade input/output terminal, that the digital mixer of the present invention have guidance data prestored therein such that the user can ascertain via which ones of the pins the respective sound signals of the PIN-specific cascade input/output channels are being communicated.

(6) Whereas the embodiment has been described as performing various processes via software programs running under the control of the CPU 18, such programs may be stored and distributed in recording media, such as a CD-ROM, flexible disk and the like, or distributed through communication channels.

What is claimed is:

1. A mixer apparatus comprising:

a plurality of mixing buses that perform mixing processing on sound signals and are capable of inputting thereto sound signals via corresponding cascade input logical channels;

a normal input terminal section that inputs thereto sound signals of a plurality of normal input physical channels;

a cascade input terminal section that inputs thereto sound signals of a plurality of channels via a plurality of cascade input physical channels corresponding to the cascade input logical channels and that includes a plurality of connection pins each corresponding to any one of said plurality of cascade input physical channels;

an input signal processing section that performs equalizing processing on the sound signals supplied via the normal input logical channels corresponding to the normal input physical channels, and outputs the sound signals, having been subjected to the equalizing processing, to one or more desired mixing buses of said plurality of mixing buses;

a model selection section that, in response to a user's operation, selects a supply source for supplying sound signals to be supplied to the cascade input logical channels;

a cascade input pin conversion section that, 1) when a first supply source of a same model as said mixer apparatus is selected by said model selection section, supplies sound signals, inputted via individual ones of said connection pins, to the corresponding cascade input physical channels, and that, 2) when a second supply source of a different model from said mixer apparatus is selected by said model selection section, changes correspondency between the connection pins and the cascade input physical channels in accordance with a predetermined change rule and supplies sound signals, supplied via the respective connection pins, to the cascade input physical channels in accordance with the changed correspondency;

an input assignment selection section that, when said second supply source is selected by said model selection section, optionally select, from among the plurality of normal input physical channels, normal input physical channels to be assigned to any of the cascade input logical channels and optionally select, from among the cascade input logical channels, cascade input logical channels the selected normal input physical channels are to be assigned to;

an input assignment section that, 1) when none of the normal input physical channels is selected by said input assignment selection section, assigns the plurality of normal input physical channels to the corresponding normal input logical channels, and that, 2) when some of the normal input physical channels are selected by said input assignment selection section, assigns the selected normal input physical channels to the cascade input logical channels and assigns the cascade input physical channels, corresponding to the assigned cascade input logical channels, to the normal input logical channels corresponding to the selected normal input physical channels to thereby effect a mutual switching between the normal input physical channels and the cascade input physical channels; and a cascade sound signal supply section that supplies the sound signals, supplied via the plurality of cascade input logical channels, to the mixing buses corresponding to the cascade input logical channels.

2. A mixer apparatus as claimed in claim 1 wherein, when a third supply source of a different model from said mixer apparatus is selected by said model selection section, said cascade input pin conversion section supplies the sound signals, supplied via the individual connection pins, to the corresponding cascade input physical channels, and said input assignment selection section not only selects, from the plurality of normal input physical channels, normal input physical channels to be assigned to any of the plurality of cascade input logical channels but also selects, from among the cascade input logical channels, cascade input logical channels the selected normal input physical channels are to be assigned to.

3. A mixer apparatus as claimed in claim 1 wherein said cascade input terminal section has a different physical shape from said normal input terminal section.

4. A sound signal processing method for a mixer apparatus, said mixer apparatus comprising: a plurality of mixing buses that perform mixing processing on sound signals and are capable of inputting thereto sound signals via corresponding cascade input logical channels; a normal input terminal section that inputs thereto sound signals of a plurality of normal input physical channels; a cascade input terminal section that inputs thereto sound signals of a plurality of channels via a plurality of cascade input physical channels corresponding to the cascade input logical channels and that includes a plurality of connection pins each corresponding to any one of said plurality of cascade input physical channels; and an input signal processing section that performs equalizing processing on the sound signals supplied via the normal input logical channels corresponding to the normal input physical channels and outputs the sound signals, having been subjected to the equalizing processing, to one or more desired mixing buses of said plurality of mixing buses, said sound signal processing method comprising:

a model selection step of, in response to a user's operation, selecting a supply source for supplying sound signals to the cascade input logical channels;

a cascade input pin conversion step of, 1) when a first supply source of a same model as said mixer apparatus is selected by said model selection step, supplying sound signals, inputted via individual ones of said connection pins, to the corresponding cascade input physical channels, and that, 2) when a second supply source of a different model from said mixer apparatus is selected by said model selection step, changing correspondency between the connection pins and the cascade input physical channels in accordance with a predetermined change rule and supplying sound signals, supplied via the respective connection pins, to the cascade input physical channels in accordance with the changed correspondency;

an input assignment selection step of, when said second supply source is selected by said model selection step, optionally selecting, from among the plurality of normal input physical channels, normal input physical channels to be assigned to any of the cascade input logical channels and optionally selecting, from among the cascade input logical channels, cascade input logical channels the selected normal input physical channels are to be assigned to;

an input assignment step of, 1) when none of the normal input physical channels is selected by said input assignment selection step, assigning the plurality of normal input physical channels to the corresponding normal input logical channels, and that, 2) when some of the normal input physical channels are selected by said input assignment selection step, assigning the selected normal input physical channels to the cascade input logical channels and assigning the cascade input physical channels, corresponding to the assigned cascade input logical channels, to the normal input logical channels corresponding to the selected normal input physical channels to thereby effect a mutual switching between the normal input physical channels and the cascade input physical channels; and a supply step of supplying the sound signals, supplied via the plurality of cascade input logical channels, to the mixing buses corresponding to the cascade input logical channels.

* * * * *